US008140596B2

(12) United States Patent
Brown et al.

(10) Patent No.: US 8,140,596 B2
(45) Date of Patent: Mar. 20, 2012

(54) SYSTEM AND METHOD FOR THE DERIVATION AND APPLICATION OF SUB-ITERATION CONTEXTS IN A TRANSFORMATION OPERATION IN A DATA INTEGRATION SYSTEM

(75) Inventors: Armageddon Rhabdizo Brown, San Jose, CA (US); David Everett Simmen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 12/579,690

(22) Filed: Oct. 15, 2009

(65) Prior Publication Data

US 2011/0093514 A1   Apr. 21, 2011

(51) Int. Cl.
*G06F 17/30* (2006.01)
*G06F 7/00* (2006.01)

(52) U.S. Cl. ....................................... 707/810
(58) Field of Classification Search .............. 707/810
See application file for complete search history.

(56) References Cited

U.S. PATENT DOCUMENTS 6,549,922 B1 *  4/2003  Srivastava et al. ...... 707/999.205
7,143,344 B2 * 11/2006  Parker et al. .................. 715/236

2008/0178132 A1    7/2008  Baumgarter et al.
2008/0320381 A1   12/2008  Sercel
2009/0037791 A1 *  2/2009  Pavlov et al. ................ 714/752

OTHER PUBLICATIONS

W. Kongdenfha et al., "Rapid Development of Spreadsheet-based Web Mashups," Track: Web Engineering/ Session: End User Web Engineering, www 2009 Madrid! pp. 851-860.
S. Murthy et al., "Mash-o-Matic," 2006, pp. 205-214.
W. Keller et al., "A Semantic Web Architecture for Advocate Agents to Determine Preferences and Facilitate Decision Making," ICEC '08 Innsbruck, Austria, pp. 1-10.

* cited by examiner

*Primary Examiner* — Sathyanarayan Pannala
(74) *Attorney, Agent, or Firm* — Elissa Wang; SVL; IP Law

(57) ABSTRACT

Methods and systems for improving a data transformation operation that converts a source data instance containing repeating elements into a target data instance having a user-specified structure, based solely on a user's specification of a target template. The methods and systems derive and calculate sub-iteration contexts by applying a selected heuristic to the source data instance and the target template, and use these sub-iteration contexts to create a target data instance having a repeating structure that agrees with the user-specified target template. The methods and systems can be customized by the selection of heuristic, and by the specification of explicit sub-iteration contexts that may override the derived contexts.

24 Claims, 15 Drawing Sheets

```xml
<emps_by_dept>
  <dept d_id="1">
    <dep_total_bonus>20000</dep_total_bonus>
    <emp>
      <last>Montoya</last>
      <first>Inigo</first>
      <workloc dept="1">Chicago</workloc>
      <bonus when="Q1">8000</bonus>
      <bonus when="Q2">3000</bonus>
    </emp>
    <emp>
      <last>Montuya</last>
      <first>Tortigo</first>
      <workloc dept="1">New York</workloc>
      <bonus when="Q1">1000</bonus>
      <bonus when="Q3">2500</bonus>
      <bonus when="Q4">4500</bonus>
    </emp>
  </dept>
  <dept d_id="2">
    <dep_total_bonus>30000</dep_total_bonus>
    <emp>
      <last>Pabisco</last>
      <first>Loo-Loo</first>
      <workloc dept="2">Chicago</workloc>
      <bonus when="Q3">5000</bonus>
    </emp>
    <emp>
      <last>Schmaah</last>
      <first>Ra-Ra</first>
      <workloc dept="2">New York</workloc>
      <bonus when="Q1">1500</bonus>
      <bonus when="Q4">6500</bonus>
    </emp>
    <emp>
      <first>Blue</first>
      <workloc dept="2">San Francisco</workloc>
      <bonus when="Q1">1500</bonus>
      <bonus when="Q2">1500</bonus>
      <bonus when="Q3">1500</bonus>
      <bonus when="Q4">2500</bonus>
    </emp>
  </dept>
  <dept d_id="3">
    <dep_total_bonus>0</dep_total_bonus>
    <emp>
      <first>No</first>
      <last>Bonus</last>
    </emp>
  </dept>
  <dept d_id="4">
    <dep_total_bonus>0</dep_total_bonus>
  </dept>
</emps_by_dept>
```

```
<output>
  <employee>
    Inigo Montoya
    <bonus_amount>8000</bonus_amount>
    <bonus_amount>3000</bonus_amount>
    <emp_total_bonus>11000</emp_total_bonus>
    <dep_total_bonus>20000</dep_total_bonus>
  </employee>
  <employee>
    Tortigo Montuya
    <bonus_amount>1000</bonus_amount>
    <bonus_amount>2500</bonus_amount>
    <bonus_amount>4500</bonus_amount>
    <emp_total_bonus>8000</emp_total_bonus>
    <dep_total_bonus>20000</dep_total_bonus>
  </employee>
  <employee>
    Loo-Loo Pabisco
    <bonus_amount>5000</bonus_amount>
    <emp_total_bonus>5000</emp_total_bonus>
    <dep_total_bonus>30000</dep_total_bonus>
  </employee>
  <employee>
    Ra-Ra Schmaah
    <bonus_amount>1500</bonus_amount>
    <bonus_amount>6500</bonus_amount>
    <emp_total_bonus>8000</emp_total_bonus>
    <dep_total_bonus>30000</dep_total_bonus>
  </employee>
  <employee>
    Blue
    <bonus_amount>1500</bonus_amount>
    <bonus_amount>1500</bonus_amount>
    <bonus_amount>1500</bonus_amount>
    <bonus_amount>2500</bonus_amount>
    <emp_total_bonus>7000</emp_total_bonus>
    <dep_total_bonus>30000</dep_total_bonus>
  </employee>
  <employee>
    No Bonus
    <emp_total_bonus>0</emp_total_bonus>
    <dep_total_bonus>0</dep_total_bonus>
  </employee>
</output>
```

FIG. 4

```
<output>
   <employee>
     {concat($BINDEXP0, " ", $BINDEXP1)}
     <bonus_amount>
       {$BINDEXP2}
     </bonus_amount>
     <emp_total_bonus>
       {sum($BINDEXP3)}
     </emp_total_bonus>
     {$BINDEXP4}
   </employee>
</output>
```

```
$BINDEXP0: /emps_by_dept/dept/emp/first
$BINDEXP1: /emps_by_dept/dept/emp/last
$BINDEXP2: /emps_by_dept/dept/emp/bonus/text()
$BINDEXP3: /emps_by_dept/dept/emp/bonus/text()
$BINDEXP4: /emps_by_dept/dept/dep_total_bonus
```

FIG. 5

```
<output>
{
    for $d in /emps_by_dept/dept
      let $d_tbonus := $d/dep_total_bonus
      for $e in $d/emp
        let $emp_first := $e/first
        let $emp_last := $e/last
        let $all_emp_b_amounts := $e/bonus/text()
        return
          <employee>
            { concat($emp_first, ' ', $emp_last) }
            {
              for $b in $e/bonus
              {
                let $b_amount := $b/text()
                return
                  <bonus_amount>{ $b_amount }</bonus_amount>
              }
            }
            <emp_total_bonus>{ sum($all_emp_b_amounts) }</emp_total_bonus>
            { $d_tbonus }
          </employee>
}
</output>
```

FIG. 6

| EXPLICITLY CREATED OUTPUT NODE | ASSOCIATED REPEATING PATH EXPRESSION |
|---|---|
| HEURISTIC A | |
| /output | NULL |
| /output/employee | NULL |
| /output/employee/bonus_amount | NULL |
| /output/employee/emp_total_bonus | NULL |
| HEURISTIC B | |
| /output | NULL |
| /output/employee | /emps_by_dept/dept/emp/bonus |
| /output/employee/bonus_amount | /emps_by_dept/dept/emp/bonus |
| /output/employee/emp_total_bonus | /emps_by_dept/dept/emp/bonus |
| HEURISTIC C | |
| /output | NULL |
| /output/employee | /emps_by_dept/dept |
| /output/employee/bonus_amount | /emps_by_dept/dept/emp/bonus |
| /output/employee/emp_total_bonus | /emps_by_dept/dept/emp/bonus |
| HEURISTIC D | |
| /output | NULL |
| /output/employee | /emps_by_dept/dept/emp |
| /output/employee/bonus_amount | /emps_by_dept/dept/emp/bonus |
| /output/employee/emp_total_bonus | /emps_by_dept/dept/emp/bonus |
| HEURISTIC E | |
| /output | NULL |
| /output/employee | /emps_by_dept/dept/emp |
| /output/employee/bonus_amount | /emps_by_dept/dept/emp/bonus |
| /output/employee/emp_total_bonus | NULL |

FIG. 8

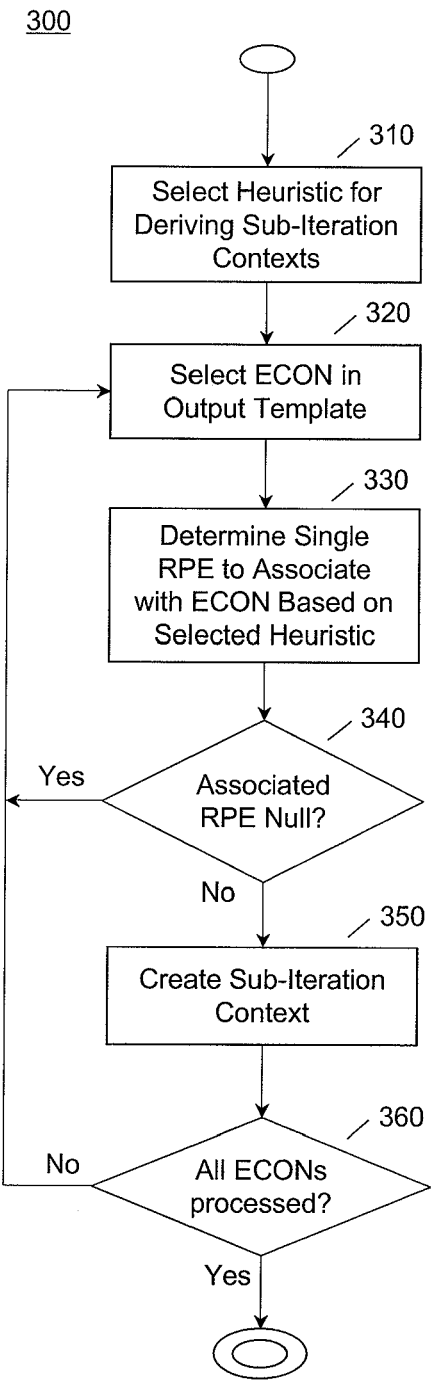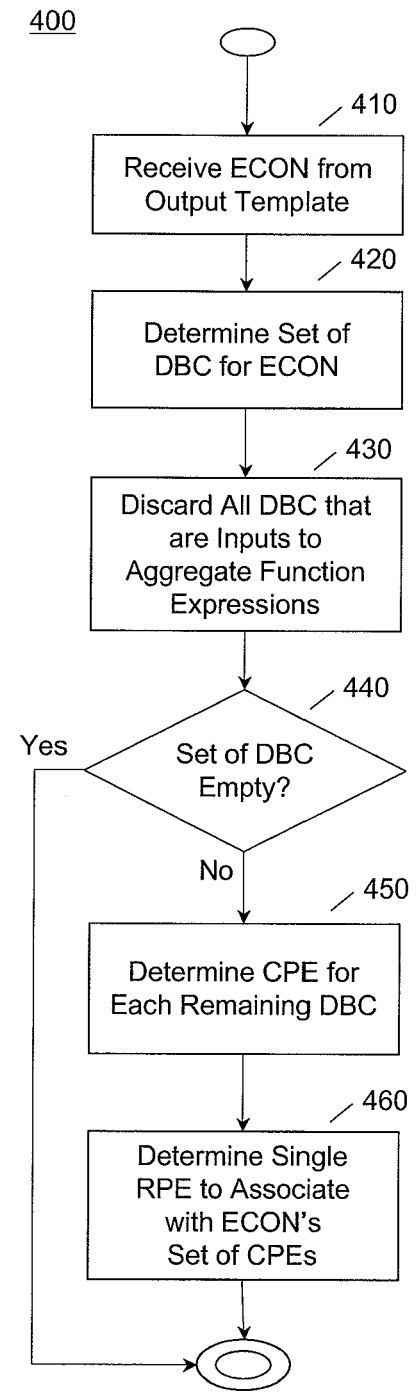
FIG. 9A
FIG. 9B

HEURISTIC A:

```
<output>
{
  let $d_tbonus := /emps_by_dept/dept/dep_total_bonus
  let $emp_first := /emps_by_dept/dept/emp/first
  let $emp_last := /emps_by_dept/dept/emp/last
  let $all_emp_b_amounts := /emps_by_dept/dept/emp/bonus/text()
  let $b_amount := /emps_by_dept/dept/emp/bonus/text()
  return
            <employee>
              { concat($emp_first, ' ', $emp_last) }
              <bonus_amount>{ $b_amount }</bonus_amount>
              <emp_total_bonus>{ sum($all_emp_b_amounts) }</emp_total_bonus>
              { $d_tbonus }
            </employee>
}
</output>
```

FIG. 11A

HEURISTIC B:

```
<output>
{       for $d in /emps_by_dept/dept
          let $d_tbonus := $d/dep_total_bonus
          for $e in $d/emp
            let $emp_first := $e/first
            let $emp_last := $e/last
            for $b in $e/bonus
              let $all_emp_b_amounts := $b/text()
              let $b_amount := $b/text()
              return
                <employee>
                  { concat($emp_first, ' ', $emp_last) }
                  <bonus_amount>{ $b_amount }</bonus_amount>
                  <emp_total_bonus>{ sum($all_emp_b_amounts) }</emp_total_bonus>
                  { $d_tbonus }
                </employee>
}
</output>
```

FIG. 11B

HEURISTIC C:

```
<output>
{
    for $d in /emps_by_dept/dept
      let $d_tbonus := $d/dep_total_bonus
      let $emp_first := $d/emp/first
      let $emp_last := $d/emp/last
    return
        <employee>
          { concat($emp_first, ' ', $emp_last) }
          {
            for $e in $d/emp
            {
              for $b in $e/bonus
                let $b_amount := $b/text()
              return
              {
                <bonus_amount>{ $b_amount }</bonus_amount>
              }
            }
            for $e in $d/emp
            {
              for $b in $e/bonus
                let $all_emp_b_amounts := $b/text()
              return
              {
                <emp_total_bonus>{ sum($all_emp_b_amounts) }</emp_total_bonus>
              }
            }
          }
          { $d_tbonus }
        </employee>
}
</output>
```

FIG. 11C

HEURISTIC D:

```
<output>
{
    for $d in /emps_by_dept/dept
      let $d_tbonus := $d/dep_total_bonus
      for $e in $d/emp
        let $emp_first := $d/emp/first
        let $emp_last := $d/emp/last
        return
          <employee>
            { concat($emp_first, ' ', $emp_last) }
            {
              for $b in $e/bonus
                let $b_amount := $b/text()
                return
                {
                  <bonus_amount>{ $b_amount }</bonus_amount>
                }
            }
            {
              for $b in $e/bonus
                let $all_emp_b_amounts := $b/text()
                return
                {
                  <emp_total_bonus>{ sum($all_emp_b_amounts) }</emp_total_bonus>
                }
            }
            { $d_tbonus }
          </employee>
}
</output>
```

FIG. 11D

Depends on the embodiment's treatment of "concat" function. Two possibilities are:
1) Error.
2)
```
<output>
 <employee>
   InigoTortigoLoo-LooRa-RaBlueNo MontoyaMontuyaPabiscoSchmaahBonus
   <bonus_amount>800030001000250045005000150065001500150015002500</bonus_amount>
   <emp_total_bonus>39000</emp_total_bonus>
   <dep_total_bonus>20000</dep_total_bonus>
   <dep_total_bonus>30000</dep_total_bonus>
   <dep_total_bonus>0</dep_total_bonus>
   <dep_total_bonus>0</dep_total_bonus>
 </employee>
</output>
```

FIG. 12A

```
<output>
  <employee>
    Inigo Montoya
    <bonus_amount>8000</bonus_amount>
    <emp_total_bonus>8000</emp_total_bonus>
    <dep_total_bonus>20000</dep_total_bonus>
  </employee>
  <employee>
    Inigo Montoya
    <bonus_amount>3000</bonus_amount>
    <emp_total_bonus>3000</emp_total_bonus>
    <dep_total_bonus>20000</dep_total_bonus>
  </employee>
  <employee>
    Tortigo Montuya
    <bonus_amount>1000</bonus_amount>
    <emp_total_bonus>1000</emp_total_bonus>
    <dep_total_bonus>20000</dep_total_bonus>
  </employee>
  <employee>
    Tortigo Montuya
    <bonus_amount>2500</bonus_amount>
    <emp_total_bonus>2500</emp_total_bonus>
    <dep_total_bonus>20000</dep_total_bonus>
  </employee>
  <employee>
    Tortigo Montuya
    <bonus_amount>4500</bonus_amount>
    <emp_total_bonus>4500</emp_total_bonus>
    <dep_total_bonus>20000</dep_total_bonus>
  </employee>
  <employee>
    Loo-Loo Pabisco
    <bonus_amount>5000</bonus_amount>
    <emp_total_bonus>5000</emp_total_bonus>
    <dep_total_bonus>30000</dep_total_bonus>
  </employee>
  ...
</output>
```

FIG. 12B

Depends on the embodiment's treatment of the "concat" function. Two possibilities are:

1) Error.

2)
```
<output>
 <employee>
  InigoTortigo MontoyaMontuya
  <bonus_amount>8000</bonus_amount>
  <bonus_amount>3000</bonus_amount>
  <bonus_amount>1000</bonus_amount>
  <bonus_amount>2500</bonus_amount>
  <bonus_amount>4500</bonus_amount>
  <emp_total_bonus>8000</emp_total_bonus>
  <emp_total_bonus>3000</emp_total_bonus>
  <emp_total_bonus>1000</emp_total_bonus>
  <emp_total_bonus>2500</emp_total_bonus>
  <emp_total_bonus>4500</emp_total_bonus>
  <dep_total_bonus>20000</dep_total_bonus>
 </employee>
 <employee>
  Loo-LooRa-RaBlueNo PabiscoSchmaahBonus
  <bonus_amount>5000</bonus_amount>
  <bonus_amount>1500</bonus_amount>
  <bonus_amount>6500</bonus_amount>
  <bonus_amount>1500</bonus_amount>
  <bonus_amount>1500</bonus_amount>
  <bonus_amount>1500</bonus_amount>
  <bonus_amount>2500</bonus_amount>
  <emp_total_bonus>5000</emp_total_bonus>
  <emp_total_bonus>1500</emp_total_bonus>
  <emp_total_bonus>6500</emp_total_bonus>
  <emp_total_bonus>1500</emp_total_bonus>
  <emp_total_bonus>1500</emp_total_bonus>
  <emp_total_bonus>1500</emp_total_bonus>
  <emp_total_bonus>2500</emp_total_bonus>
  <dep_total_bonus>30000</dep_total_bonus>
 </employee>
 <employee>
  <dep_total_bonus>0</dep_total_bonus>
 </employee>
 <employee>
  <dep_total_bonus>0</dep_total_bonus>
 </employee>
</output>
```

FIG. 12C

```xml
<output>
  <employee>
    Inigo Montoya
    <bonus_amount>8000</bonus_amount>
    <bonus_amount>3000</bonus_amount>
    <emp_total_bonus>8000</emp_total_bonus>
    <emp_total_bonus>3000</emp_total_bonus>
    <dep_total_bonus>20000</dep_total_bonus>
  </employee>
  <employee>
    Tortigo Montuya
    <bonus_amount>1000</bonus_amount>
    <bonus_amount>2500</bonus_amount>
    <bonus_amount>4500</bonus_amount>
    <emp_total_bonus>1000</emp_total_bonus>
    <emp_total_bonus>2500</emp_total_bonus>
    <emp_total_bonus>4500</emp_total_bonus>
    <dep_total_bonus>20000</dep_total_bonus>
  </employee>
  <employee>
    Loo-Loo Pabisco
    <bonus_amount>5000</bonus_amount>
    <emp_total_bonus>5000</emp_total_bonus>
    <dep_total_bonus>30000</dep_total_bonus>
  </employee>
  <employee>
    Ra-Ra Schmaah
    <bonus_amount>1500</bonus_amount>
    <bonus_amount>6500</bonus_amount>
    <emp_total_bonus>1500</emp_total_bonus>
    <emp_total_bonus>6500</emp_total_bonus>
    <dep_total_bonus>30000</dep_total_bonus>
  </employee>
  <employee>
    Blue
    <bonus_amount>1500</bonus_amount>
    <bonus_amount>1500</bonus_amount>
    <bonus_amount>1500</bonus_amount>
    <bonus_amount>2500</bonus_amount>
    <emp_total_bonus>1500</emp_total_bonus>
    <emp_total_bonus>1500</emp_total_bonus>
    <emp_total_bonus>1500</emp_total_bonus>
    <emp_total_bonus>2500</emp_total_bonus>
    <dep_total_bonus>30000</dep_total_bonus>
  </employee>
  <employee>
    No Bonus
    <dep_total_bonus>0</dep_total_bonus>
  </employee>
</output>
```

FIG. 12D

SYSTEM AND METHOD FOR THE
DERIVATION AND APPLICATION OF
SUB-ITERATION CONTEXTS IN A
TRANSFORMATION OPERATION IN A DATA
INTEGRATION SYSTEM

BACKGROUND

1. Technical Field

The present invention relates generally to sub-iteration contexts in a transformation operation in a data integration system, and more particularly to systems and methods for the derivation and application of sub-iteration contexts to provide meaningful target data in a transformation operation in a data integration system.

2. Discussion of Related Art

Data integration systems such as ETL systems (e.g. IBM InfoSphere DataStage) and data mashup systems (e.g. IBM InfoSphere MashupHub) commonly provide transformation operators (e.g. the Transform or Extract operators of InfoSphere MashupHub Version 2.0) that perform a transformation operation wherein source data is transformed from one format and structure to another. Such transformation operations often involve the creation of elements and attributes whose structure and content are derived from expressions involving repeating elements of the source data. In order to create the necessary elements and attributes, the user must be both technically knowledgeable and have detailed knowledge about the incoming data, which is very difficult in the context of a data mashup system because the data is coming from a variety of dynamic, external sources pulled from around the Web.

As an example, a user of a data mashup system might wish to perform a "transformation operation" that converts a source feed containing repeating elements into a target feed. In order to handle the transformation of the repeating elements, current data integration systems and tools require explicit specification of sub-iteration points in the definition of a transformation operation. For example, a transformation operation might be specified in full programmatic detail using languages such as XQuery or XSLT.

Data integration tools such as Clio improve upon this approach by allowing a transformation operation to be programmed graphically through specification of associations between a source schema and target schema. These schemas represent, respectively, the format and structure of all possible source and target instance data; consequently, the user must understand the structure of all possible source and target data instances in order to design correct source and target schemas. In particular, the user must understand the repeating properties of the data in order to correctly specify the repeating attributes of schema elements (e.g. the "minoccurs" and "maxoccurs" attributes in Xschema).

BRIEF SUMMARY

Accordingly, embodiments of the present invention include a method for deriving and applying sub-iteration contexts in a transformation operation in a data integration system, comprising receiving a source data instance comprising a plurality of source nodes with associated source node values, and a plurality of source data paths connecting the source nodes, detecting one or more repeating path expressions in the source data instance, wherein a repeating path expression is a source data path that connects two or more source nodes that are siblings to each other, receiving a target template comprising a plurality of explicitly created output nodes (ECONs), wherein the target template specifies a structure of a target data instance, deriving one or more sub-iteration contexts for each ECON in the received target template, wherein each sub-iteration context comprises an association between the ECON and one of the detected repeating path expressions, and wherein each sub-iteration context directs how the ECON will repeat in the target data instance, calculating a set of one or more sub-iteration points and a set of exact bindings from the derived sub-iteration contexts, generating a transformation specification from the set of sub-iteration points and exact bindings, and applying said transformation specification to the source instance data to generate the target data instance. The embodiments further include a program product apparatus and a system for deriving and applying sub-iteration contexts in a transformation operation in a data integration system as described above.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL
VIEWS OF THE DRAWINGS

FIG. 3 depicts exemplary source data according to an embodiment of the present invention.

FIG. 4 depicts exemplary target data according to an embodiment of the present invention.

FIG. 5 depicts a user-specified target template and a set of generic user-specified bindings according to an embodiment of the present invention.

FIG. 6 depicts a transformation specification according to an embodiment of the present invention.

FIG. 8 depicts the explicitly created output nodes and associated repeating path expressions for each of five exemplary heuristics for deriving sub-iteration contexts according to an embodiment of the present invention.

FIGS. 9A and 9B are flowcharts depicting the derivation of sub-iteration contexts using a selected heuristic according to an embodiment of the present invention.

FIGS. 11A through 11D depict exemplary XQuery transformation specifications derived using four different heuristics according to an embodiment of the present invention.

FIGS. 12A through 12D depict exemplary target data created using four different heuristics according to an embodiment of the present invention.

DETAILED DESCRIPTION

The present embodiments greatly simplify transformation operations involving repeating data in data integration systems, by allowing a data transformation operation to be defined via specification of only the target template and a set of generic bindings. The target template defines only the basic structure of the desired target data; it does not define the repeating structure of the target data. The repeating structure is instead inferred by the disclosed systems and methods from sub-iteration points and exact bindings that are automatically calculated through analysis of the repeating structure of the exemplary source data, of the target template, and of the specified generic bindings. In particular, various embodiments of the present invention relate to data mashup data integration systems, such as IBM InfoSphere MashupHub, which allow the movement of data from one or more input sources through filter, aggregation, transformation, and other operators as defined by a data mashup specification and evaluated by an integration engine, ultimately producing a target data instance having a user-specified structure.

Figure 1:
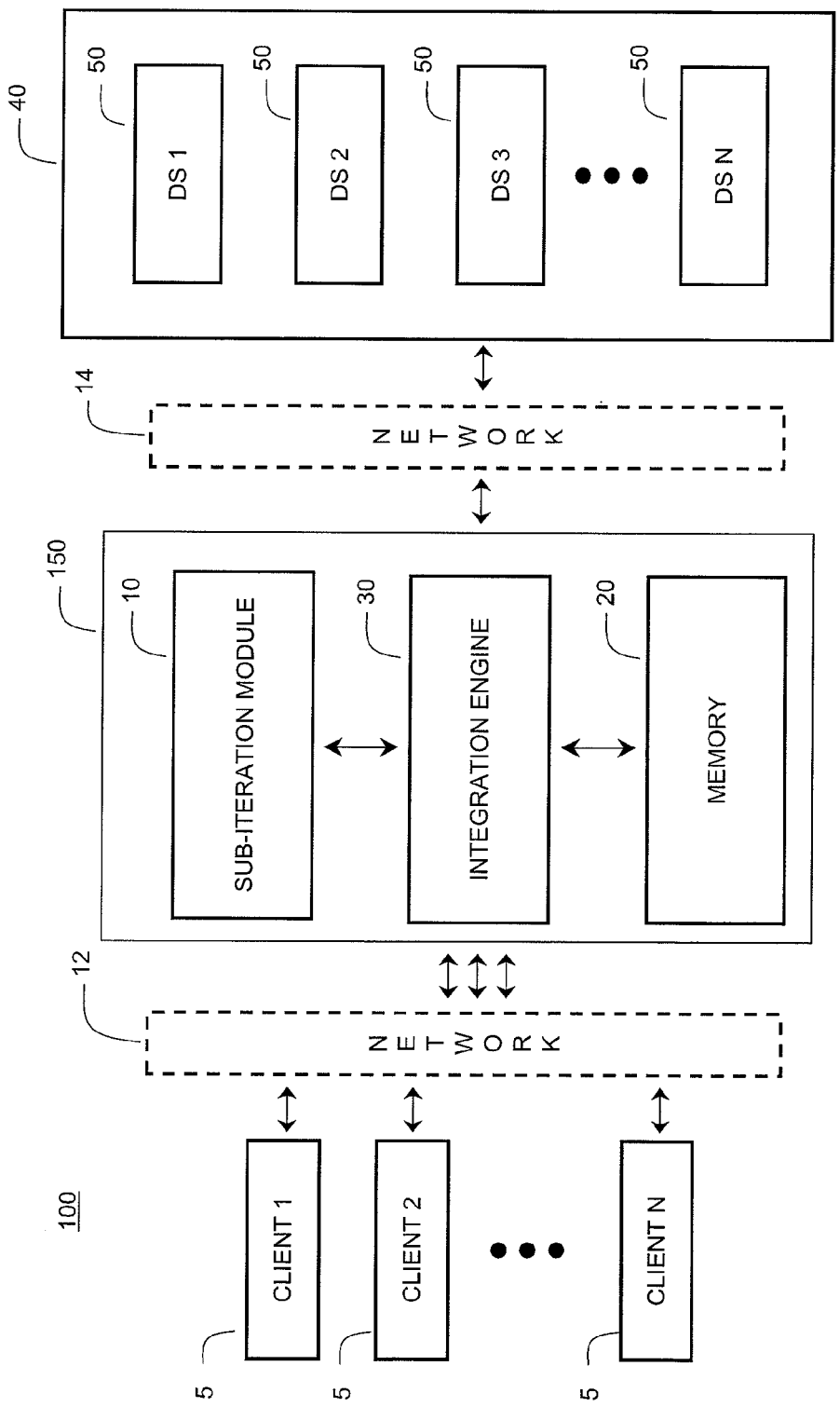
FIG. 1 is a block diagram of a data integration system having a sub-iteration module according to an embodiment of the present invention.
Figure 2:
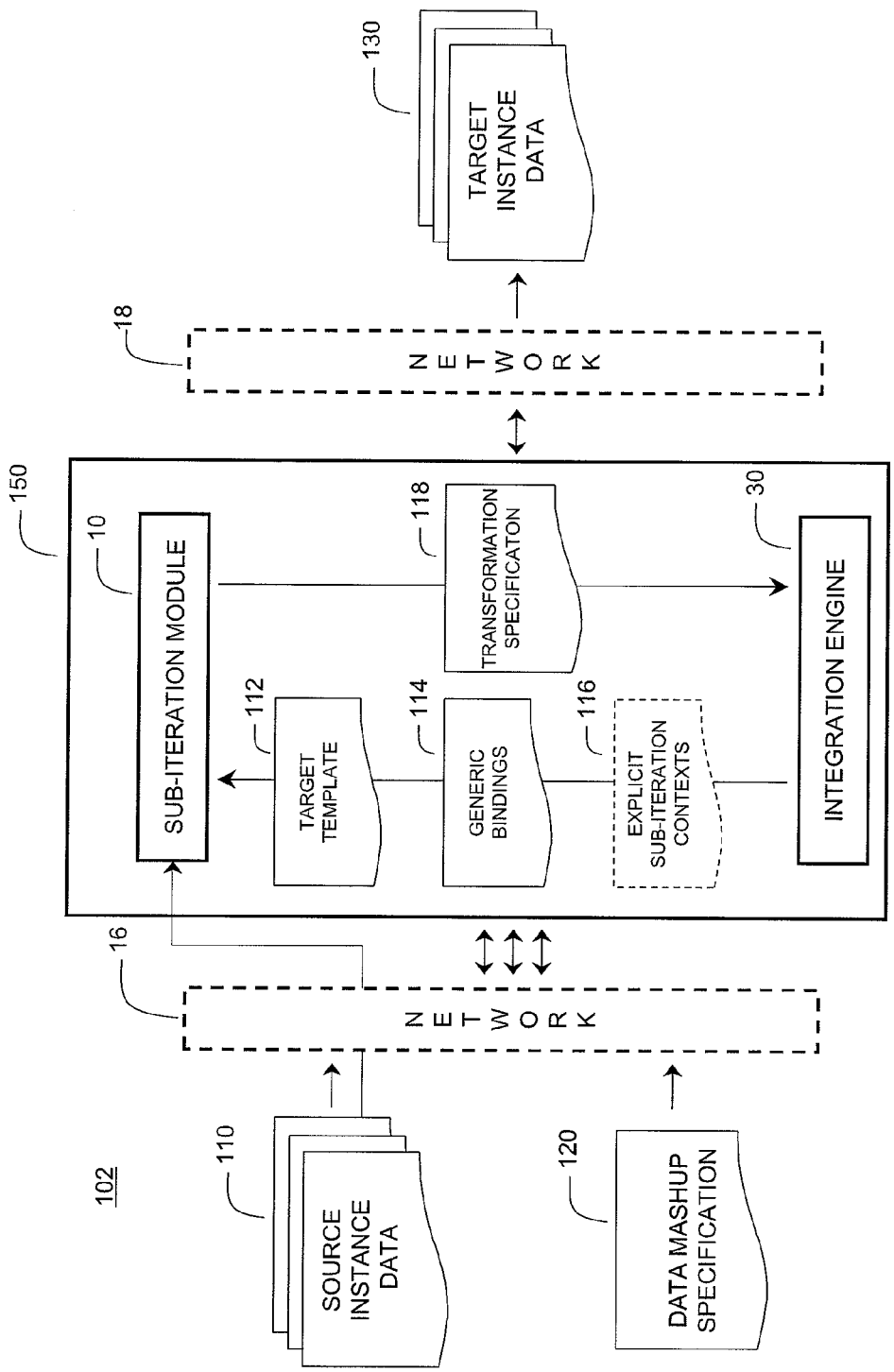
FIG. 2 is a block diagram illustrating the inputs and outputs of a data integration system having a sub-iteration module according to an embodiment of the present invention.

Referring now to the Figures, exemplary systems according to embodiments of the present invention are illustrated in FIGS. 1 and 2. The system shown in FIG. 1 is particularly suited to the derivation and application of transformation specifications using sub-iteration contexts to provide meaningful target data for a transformation operator in a data mashup data integration system. The system 100 includes a data integration system 150 comprising sub-iteration module 10, memory 20, and integration engine 30. The system 100 also includes data sources 40 such as a web service, database management system (DBMS), or desktop file system 50 containing data, all of which are connected over networks 12, 14 to each other and to clients 5. The system 100 may include additional servers, clients, and other devices not shown, and individual components of the system may occur either singly or in multiples, for example, there may be more than one data source area in the system. The data sources 40 may be local to the sub-iteration module 10 and integration engine 30, or remote from and in communication with the integration engine 10 and sub-iteration module 30 via a network 14.

The system shown in FIG. 2 illustrates the inputs and outputs of a data mashup data integration system having a sub-iteration module according to an embodiment of the present invention. The system 102 includes a data integration system 150, for example the system depicted in FIG. 1, comprising a sub-iteration module 10 and an integration engine 30. The system 102 may include additional servers, clients, inputs, outputs, data sources and other devices not shown, and individual components of the system may occur either singly or in multiples. The components, inputs and outputs may be local to, or remote from and in communication with, the sub-iteration module 10 and integration engine 30 via one or more networks 16, 18.

System 102 has two inputs: one or more instances of source data 110, and a data mashup specification 120, which are received by the system over network 16. The data mashup specification 120 describes how transformation operators and other data mashup operators are composed into a program that can be executed by the integration engine 30. There is one output to the system: a single instance of target data 130 derived from the one or more instances of source data according to the data mashup specification, which is output by the system over network 18. The sub-iteration module 10 augments the workings of the integration engine 30 by determining a transformation specification for each transformation operator in the data mashup specification. There are four inputs provided to the sub-iteration module for each transformation operator: one or more instances of exemplary source data 110, which might come either directly from a data source or from the output of another data mashup operator, a user-specified target template 112, a set of generic user-specified bindings 114, and an optional set of explicit sub-iteration contexts 116. The sub-iteration module 10 provides one output to the integration engine 30: a transformation specification 118.

Generally, clients 5 provide an interface to the functions provided by the integration engine 30 and sub-iteration module 10, for example, mechanisms for specifying a target template, etc. The clients 5 may be local to the integration engine 30 and sub-iteration module 10 and data sources 40, or remote from and in communication with the integration engine and sub-iteration module 10 and data sources 40 via networks 12, 14. The end-user clients 5 may be implemented by any quantity of conventional or other computer systems or devices (e.g., computer terminals, personal computers (e.g., IBM-compatible, Apple MacIntosh, tablet, laptop, etc.), cellular telephone, personal data assistant (e.g., Palm Pre, Treo, iPhone, etc.), and may include any commercially available operating system (e.g., AIX, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information.

The sub-iteration module 10 may be implemented in the form of a processing system, or may be in the form of software. A processing system may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). If embodied in software, the sub-iteration module 10 may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

For example, the sub-iteration module 10 can be implemented as software, for example one or more software modules that work together with the integration engine 30 to perform the disclosed methods. The integration engine 30 can be any type of server or system in which data is integrated and transformed and the disclosed system and method are desirable, for example an Extract, Transform and Load (ETL) system or data mashup data integration system, or any combination of these, such as Apatar, IBM Mashup Center, JackBe Presto, Microsoft Popfly, Mozilla Ubiquity, or Yahoo Pipes. Although depicted in FIG. 1 as a server-based system, the system may also be Web-based or structured in any suitable fashion as is desired for a particular application.

Memory 20 may be implemented by any conventional or other memory or storage device (e.g., RAM, cache, flash, etc.), and may include any suitable storage capacity. The data sources 40 may be local to the sub-iteration module 10, or remote from and in communication with the sub-iteration module 10 via a network 14. The data sources 40 may be implemented by any quantity of any type of conventional or other web services, file systems, databases, or storage structures (e.g., files, data structures, web-based storage, disk or other storage, etc.). The data sources 50 may store any desired information arranged in any fashion (e.g., web feeds, spreadsheets, tables, relations, objects, etc.).

The networks 12, 14, 16, 18 may be implemented by any quantity of any suitable communications media (e.g., WAN, LAN, Internet, Intranet, wired, wireless, etc.). The computer systems of the present invention embodiments may include any conventional or other communications devices to communicate over the networks via any conventional or other protocols, and may utilize any type of connection (e.g., wired, wireless, etc.) for access to the network.

The source instance data 110 can be available from one or more data sources, which may be the same or varied, and can be available as, e.g., a separate file, database, or other data store, etc. The data source can be any suitable data source, such as an enterprise data source, personal and intra-organization data sources, or web-based data sources. Enterprise data sources can include databases such as DB2, Oracle, PeopleSoft, and MSSQL, IBM Enterprise Content Management (ECM) systems, ERP systems, data warehouses, and the like. Personal and intra-organization data sources can include information stores and tools such as spreadsheets (e.g., Microsoft Excel), databases (e.g., Microsoft Access, MySQL), Sharepoint, Quickr, XML, etc. Web-based data sources can include any data sources on the external web, for example news sources (e.g., Google News, Yahoo News, company news feeds, etc.), public databases (e.g., tax records, real estate records, court documents, etc.), web sites (e.g., via Dapper web site extraction), web services, REST XML feeds, SOAP, StrikeIron, etc. As is evident from the foregoing description, the source instance data can take one or more formats, can originate from one or more information sources, and can be dynamic, e.g., subject to change on a frequent basis.

The target instance data 130 can be in any suitable and desired form, and may be a feed such as an RSS, ATOM, XML, or JSON that is accessible via an Internet or Intranet using an HTTP URL, published in a browser-based application, or stored in a database or other data storage area, e.g., in data storage system 40.

As shown in FIGS. 3 and 4, the source instance data 110 and the target instance data 130 can be displayed as a data tree comprising nodes and values for the nodes. FIG. 3 shows an exemplary data tree for illustrative source instance data 110 that includes a node defining a department, and the department node in turn has a child node defining an employee. The employee node has several child nodes, including an employee name node, an employee work location node, and an employee bonus node, and all of these child nodes are considered to be siblings to each other. Each node has an associated value, for example the employee name node can have a value of "Inigo Montoya" and the employee work location node has a value of "Chicago." The depicted source instance data feed contains repeating elements about departments (the /emps_by_dept/dept nodes) and each of these in turn includes repeating elements that contain data about the employees in that department (the /emps_by_dept/dept/emp nodes). FIG. 4 shows an exemplary data tree for illustrative target instance data 130 that contains repeating elements corresponding to employees (the /output/employee nodes) and each of these in turn includes elements with information about the employee's department (the /output/employee/dept_total_bonus nodes).

Each node in a data tree is connected to at least one other node by a data path. For example, in the exemplary data tree of FIG. 3 the data paths would include the following, among others:

/emps_by_dept/dept
/emps_by_dept/dept/emp
/emps_by_dept/dept/emp/last
/emps_by_dept/dept/emp/first
/emps_by_dept/dept/emp/workloc
/emps_by_dept/dept/emp/bonus In one embodiment of the invention, the source instance data 110 comprises a plurality of input nodes and a plurality of input data paths connecting the input nodes. For example, in a data mashup environment, the source instance data can include multiple sources, e.g., the described data tree of information about the department and employees, and another source such as a query result from a public database of scientific publications. The scientific publication query result has various nodes, for example an article node having various child nodes such as author name, author address, article title, journal title, publisher name, publication year, etc.

FIG. 5 depicts an exemplary user-specified target template 112 and generic user-specified bindings 114 for the exemplary data of FIGS. 3 and 4. The user-specified target template 112 defines the basic structure and content of the target instance data, and can be any suitable template, for example, an XML document, or serialized JSON or JAVA object. In particular, the user-specified target template 112 defines the target data structure through explicitly created elements and attributes, and it defines content for those new elements and attributes via binding variable references. Together, the target template 112 and generic bindings 114 of a transformation operation define how elements, attributes, and content of the source instance data feed are mapped to elements, attributes, and content of the target instance data feed.

The user can specify the target template 112 and generic bindings 114 in any suitable fashion, for example by using a graphical user interface (GUI) to develop the template by, e.g., a drag and drop or clickable interface. In another embodiment of the invention, the user-specified target template 112 is represented as an XML data tree comprising one or more explicitly created output nodes (ECONs). An ECON is a node that is created by the user during the process of specifying the target template. The exemplary target template of FIG. 5 contains four ECONs: "output", "employee", "bonus_amount", and "emp_total_bonus".

In general, each transformation specification 118 is defined by the collection of a user-specified target template 112, a set of sub-iteration points, and a set of exact bindings. The sub-iteration points and exact bindings are calculated based on sub-iteration contexts, of which there are two kinds: 1) derived sub-iteration contexts, which are created by the sub-iteration module itself, as described further below, and 2) explicit sub-iteration contexts 116, which are created by the integration engine. An explicit sub-iteration context 116 is received from the integration engine, and is in a sense a "forced" point of iteration that has been defined in order to produce a particular iteration result. The explicit sub-iteration contexts 116 can be created, for example, automatically for certain operations such as the Extract (UnNest) operator, or in response to the user specifying that a certain type of iteration should occur. These explicit sub-iteration contexts 116 co-exist with, and can potentially override, the sub-iteration contexts that are derived by the disclosed processes. Thus the explicit sub-iteration contexts 116 allow the integration engine to directly influence the repeating behavior of template nodes within the final transformation specification, when and if such influence is required to achieve a particular target instance structure.

The transformation specification 118 can take any suitable form, and generally represents the logic of a transformation operation that converts source instance data 110 (e.g., the XML feed of FIG. 3) into target instance data 130 (e.g., the XML feed of FIG. 4). FIG. 6 depicts an illustrative transformation specification 118, written as an XQuery expression, for the exemplary data of FIGS. 3 and 4. When applied to the source instance data 110 of FIG. 3, the transformation specification 118 of FIG. 6 will return the target instance data 130 of FIG. 4. The transformation specification is created by the sub-iteration module 10, e.g., after the receipt of the source data instance 110, the target template 112, the set of generic bindings 114, and optionally a set of explicit sub-iteration contexts 116, the sub-iteration module 10 generates the necessary sub-iteration points and exact bindings for the transformation operation, and returns a complete transformation specification 118 to the integration engine 30 for execution, without requiring any further information from the end user. The integration engine uses the transformation specification to implement sub-iteration processing within the transformation operator, which in turn allows for the creation of a target data instance 130 whose structure agrees with the user-specified target template 112 and bindings 114, and at the same time repeats, where appropriate, according to any one of numerous possible heuristics.

Referring now to FIG. 6, the FOR loops in the depicted XQuery expression define "sub-iteration points" of the transformation operation. Each sub-iteration point loops over "repeating elements" of the source instance data. The order in which the sub-iteration points are nested in the transformation specification 118 essentially determines the repeating structure of the target instance data. The LET expressions define "bindings" of the transformation operation. Bindings assign the results of "binding expressions" to "binding variables." The binding expressions compute new elements, attributes and content from data in the source feed. An "exact" binding is one in which the binding expression is defined with respect to a sub-iteration point; a binding which is not an exact binding is a "generic" binding. Finally, the RETURN clause of the XQuery, along with the XML elements encapsulating the FOR, LET, and RETURN clauses, defines the "target template" of the transformation operation.

In a preferred embodiment, the integration engine 30 parses a data mashup specification potentially containing transformation operations, and for each such operation, provides exemplary source data instances 110, a target template 112 specified by the user, a set of generic bindings 114, and optionally a set of explicit sub-iteration contexts 116 to the sub-iteration module 10. The sub-iteration module 10 subsequently returns the full transformation specification 118 of the transformation operation to the data integration engine, which in turn compiles the transformation specification into a program of low-level operators that can transform any source data instance 110 into a target data instance 120 according to the returned transformation specification. Because the target template 112 lacks information about if and how the various pieces of the target template should repeat, especially in the face of source data which may contain repeating structures, there are many different ways to interpret the user-specified target template when repeating source structures are present. To provide flexibility in the face of varying data, the system selects and applies a heuristic to determine which of the possible interpretations is to be applied for a given transformation operation. The heuristic can be selected in any suitable way, e.g., specified by the user, chosen automatically depending on the structure of the source data instance, etc.

In another embodiment, methods are provided by which the sub-iteration module derives a "sub-iteration context" for each constructed element in the user-specified target template. Derivation of a sub-iteration context for a constructed output element occurs via a) recognition of repeating source structures through analysis of the available source data instances, and b) analysis of generic bindings that are associated with the selected constructed element. Such generic bindings refer to nodes or values from the source instance data. The explicit sub-iteration contexts, if present, are specified either directly by the user, or by the data mashup data integration system with which the sub-iteration module is communicating.

Another embodiment of the invention discloses a method by which the sub-iteration module analyzes a combined set of derived and explicit sub-iteration contexts in such a way as to allow for the calculation of sub-iteration points and exact bindings. If explicit sub-iteration contexts exist, they will coexist with, and potentially override, other derived sub-iteration contexts. The final set of sub-iteration points and exact bindings can then be used to generate a transformation specification which, when executed, transforms the source instance data into a target data instance that agrees with the user-specified template and generic bindings.

The benefits of the sub-iteration module and the processes it performs of deriving a transformation specification using sub-iteration contexts can be seen from the following description of FIGS. 7 through 10. The processes performed by the module are described in the context of exemplary source data that illustrates the features, details and advantages of the processes. For example, the sub-iteration processes described herein are deterministic and predictable, in the sense that when applied, they always return exactly one of the various possible target formats for a given user-specified target template.

In the context of a data mashup data integration system, the disclosed methods offer various benefits, such as that the disclosed methods for deriving sub-iteration contexts do not require the user to provide an input schema. Instead, the derivation process works from one or more instances of the source data itself, and infers information about which source structures repeat based on those instances. So unlike schema-mapping systems like IBM's Clio, where the user must specify (and therefore have access to) a full input schema that describes all potential repeating structures within the input, the disclosed methods detect repetition in the source data automatically, and derive sub-iteration contexts accordingly.

Another benefit is that the disclosed methods for deriving sub-iteration points and explicit bindings do not require the user to provide an output schema. The user does have to specify generic bindings that relate nodes and values from the source feed to specific nodes and locations in the target feed, but that information occurs naturally as part of the target template creation process. Not only does the user not have to specify a formal schema, but no explicit directives are needed to indicate which constructed elements must repeat. Instead, the user simply creates a template that loosely describes what the desired feed should look like. Repetition of the target structures will then occur automatically as a result of the disclosed methods. Moreover, the method of deriving transformation specifications using sub-iteration contexts is not limited to use with data mashup transform operators (e.g. the Transform operator of IBM InfoSphere MashupHub). This method can be used to derive transformation specifications for other data mashup operators, including (but not limited to) unnest, group, and filter operators.

Figure 7:
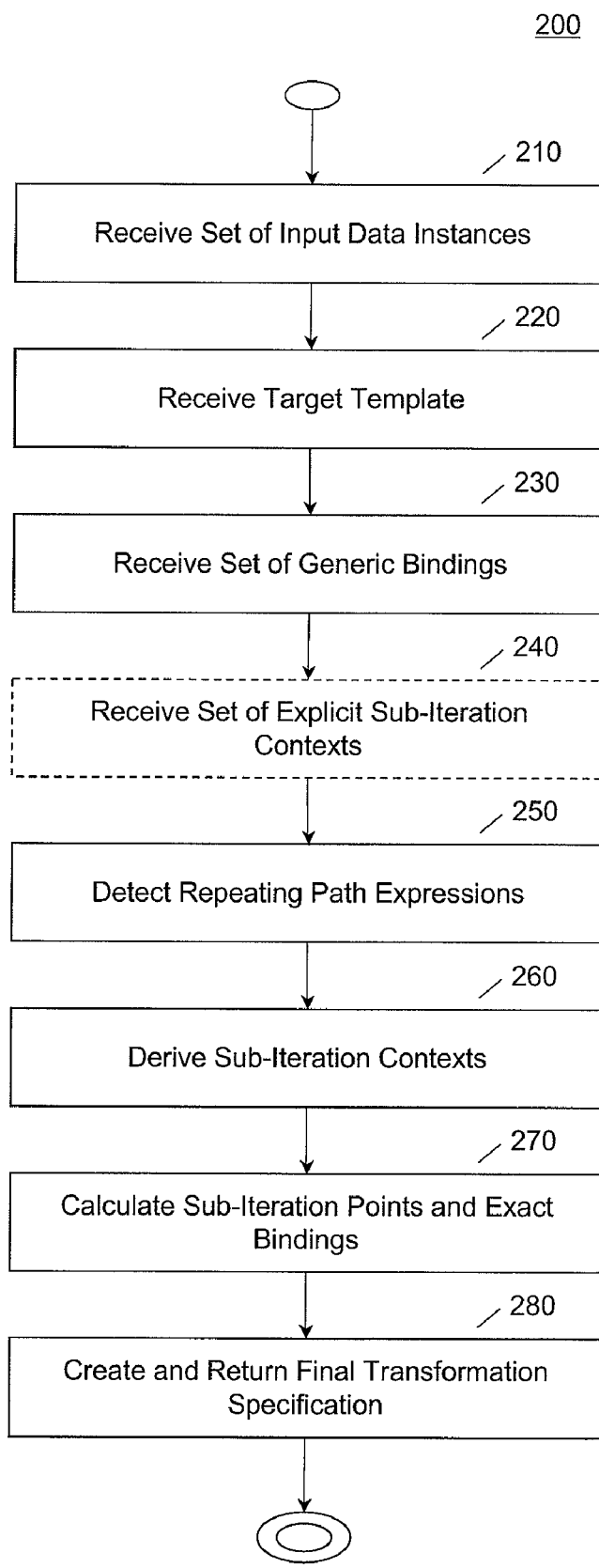
FIG. 7 is a flowchart depicting the derivation and application of sub-iteration contexts in a transformation operation in a data integration system according to an embodiment of the present invention.
Figure 10:
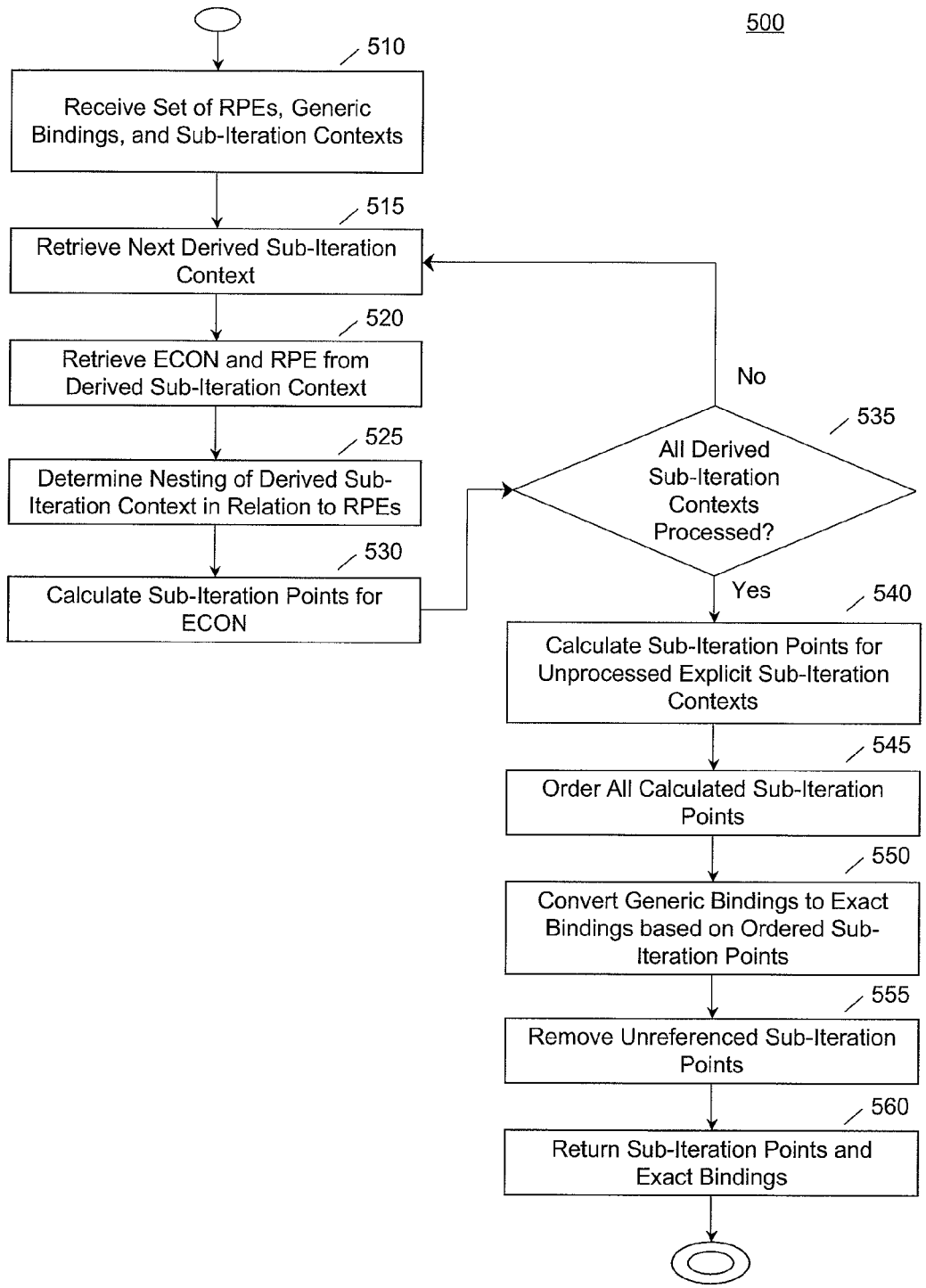
FIG. 10 is a flowchart depicting the calculation of sub-iteration points and exact bindings based on derived sub-iteration contexts according to an embodiment of the present invention.

Generally, the sub-iteration module 10 that has been previously described performs the steps of FIGS. 7 and 9-10. Referring now to FIG. 7, the reference numeral 200 generally designates a flow chart depicting the derivation and application of sub-iteration contexts in a data transformation system. The process is described in the context of a particular example, in which the source feed data is the employee data shown in FIG. 3 and the user wishes to create a target feed which looks like the one shown in FIG. 4.

The illustrative embodiment described herein is an XQuery-based data mashup data integration system analogous to an illustrative embodiment described in the U.S. patent application entitled, "INTEGRATING DATA RESOURCES BY GENERIC FEED AUGMENTATION," attorney's reference number SVL920070098US1. In the illustrative embodiment, a data mashup is represented as a data flow network of operators that interoperate in a demand-driven data flow fashion. Each operator consumes one or more source XML feeds and produces a target XML feed. Operators may have operands that provide an operator with input parameters. For example, operands to a Transform operator might include a reference to the operator providing source instance data, a set of binding expressions used to extract target instance data from the source instance data, and a target template describing the basic structure and format of the target XML feed ultimately produced by the operator. The main data processing logic of the operators is implemented by evaluating XQuery expressions using an auxiliary XQuery engine. The specific XQuery expression(s) used by a particular operator instance to perform its data manipulation logic is generated dynamically from a basic template and from the operands that are passed to the operator. For example, FIG. 6 shows an XQuery expression that could be generated dynamically for a Transform operator given the target template and generic bindings shown in FIG. 5, where the input operator to the Transform provides the source instance data from FIG. 3.

As described herein with reference to the illustrative embodiment, the sub-iteration module can prove useful for any operator that requires sub-iteration processing, including a Transform operator, an UnNest or Extract operator, a Group operator, or a Filter operator. In the particular case of a Transform operator, the operands to the Transform easily provide the four primary inputs that are needed by the sub-iteration module, namely: 1) a set of source data instances; 2) a target template; 3) a set of generic bindings; and 4) an optional set of explicit sub-iteration contexts.

In step 210, the sub-iteration module receives a set of source data instances, in step 220 the module receives a target template, and in step 230 the module receives a set of generic bindings. Optionally, in step 240 the sub-iteration module receives a set of explicit sub-iteration contexts. In step 250, the sub-iteration module detects repeating path expressions in the source data. Having received a set of one or more source data instances, the sub-iteration module analyzes the source data instances and then infers two things: a) every possible distinct data path, and b) which of those data paths represents a "repeating path expression." A "repeating path expression" (RPE) is a data path which, when applied to any single instance of source data, returns two or more nodes that are siblings to each other.

For the exemplary source instance data shown in FIG. 3, the detection of repeating paths (step 250) will first find all of the following distinct data paths:

```
/emps_by_dept
/emps_by_dept/dept
/emps_by_dept/dept/@d_id
/emps_by_dept/dept/dep_total_bonus
/emps_by_dept/dept/dep_total_bonus/text( )
/emps_by_dept/dept/emp
/emps_by_dept/dept/emp/last
/emps_by_dept/dept/emp/last/text( )
/emps_by_dept/dept/emp/first
/emps_by_dept/dept/emp/first/text( )
/emps_by_dept/dept/emp/workloc
/emps_by_dept/dept/emp/workloc/@dept
/emps_by_dept/dept/emp/workloc/text( )
/emps_by_dept/dept/emp/bonus
/emps_by_dept/dept/emp/bonus/@when
/emps_by_dept/dept/emp/bonus/text( )
```

Of these paths, there are only three which are repeating path expressions, according to the definition above: /emps_by_dept/dept, /emps_by_dept/dept/emp, and /emps_by_dept/dept/emp/bonus, and so these three paths will be returned from step 250. Note that a path expression like "/emps_by_dept/dept/emp/last" or "/emps_by_dept/dept/emp/bonus/@when" is not called a repeating path expression, even though evaluation of it against the source instance data would return multiple nodes, because, of those multiple nodes, none of them would be siblings to each other.

In step 260, the sub-iteration module derives sub-iteration contexts, as is further described below with reference to FIGS. 8 and 9. A sub-iteration context is an association between a single ECON and at most one of the RPEs from step 250. The association of each ECON with a particular repeating path expression is key to determining what the overall repeating behavior of the target instance structures will be. The sub-iteration module derives the contexts using a particular selected heuristic, which may be pre-determined, may be selected by the module, or may be selected in any other suitable manner, depending on the inputs received in steps 210 through 240. Regardless of which heuristic has been selected and applied, the end goal of step 260 is to have every ECON associated with at most one RPE, as specified by the chosen heuristic. The associations of ECONs and RPEs then comprise the derived sub-iteration contexts for the transformation.

Some heuristics are more helpful for specific types of data mashup operators than others. As will be apparent to those skilled in the art, no single heuristic for determining a set of sub-iteration contexts will apply to all transformations equally well. The heuristics described herein are for illustrative purposes only, and other heuristics may be selected and applied as desired in the disclosed methods. The heuristic can be pre-selected or pre-determined by the user, can be selected automatically by the system, or can be selected in any other suitable manner. In one embodiment, the system has a plurality of heuristics, all of which are applied to derive all of the various sub-iteration contexts for a given transformation. The results of each heuristic are then presented to the user, allowing the user to browse the different choices and then select the repeating behavior (and hence the underlying heuristic) that most closely fits the desired outcome. In another embodiment, the system applies a plurality of heuristics to derive different sets of sub-iteration contexts, applies a "usefulness" scoring function to each set based on scoring criteria that is static or dynamic, internal or user-specified, and then, ultimately, selects the set of sub-iteration contexts (and hence the underlying heuristic) which has the highest score. Still other embodiments allow the user to specify a particular heuristic of his/her own choosing as part of the transformation operator itself, or as a configuration parameter to the data mashup data integration system.

By way of example, FIG. 8 illustrates the explicitly created output nodes and associated repeating path expressions for each of five exemplary heuristics (A through E). The different sets of sub-iteration contexts are derived by each heuristic from the exemplary source data of FIG. 3 and the target template and generic bindings of FIG. 5, using the exemplary RPEs noted above from step 250. Note that, depending on the heuristic in use, an ECON may not be associated with any RPEs at all. Such an ECON has a "NULL" as its RPE in FIG. 8. A NULL RPE indicates that an ECON does not introduce any sub-iteration of its own, though it may exist within sub-iteration of its ancestor ECONs, if any.

Referring to FIG. 8, Heuristic A effectively says "do not repeat any ECONs," whereas Heuristic B says "repeat all ECONs, except for the root 'output' ECON, based on the single most deeply-nested repeating source structure that is referenced by the target template." Heuristics C through E are more advanced heuristics, all of which attempt to associate each ECON with the one repeating path expression that most closely reflects the repeating characteristics of all source nodes referenced directly by that ECON. The operation of Heuristic E is illustrated in detail in the preceding Figures, for example, FIG. 6 shows the XQuery transformation specification for Heuristic E, which when executed by the integration engine against the source feed of FIG. 3, will return the target feed of FIG. 4. Heuristic E is described in further detail below, with reference to FIGS. 9A and 9B. FIGS. 11A through 11D illustrate how each of Heuristics A through D, respectively, would map into an XQuery transformation specification after completion of the steps in FIG. 10, which are described in further detail below. FIGS. 12A through 12D illustrate what the target data instance would look like if each respective transformation specification is executed against the source instance data of FIG. 3.

In step 270, the sub-iteration module calculates sub-iteration points and exact bindings from the derived sub-iteration contexts of step 260 and from any received explicit sub-iteration contexts, as is further described below with reference to FIG. 10. In step 280, the sub-iteration module uses the calculated sub-iteration points and exact bindings to create a final transformation specification, which is returned to the integration engine. In a preferred embodiment, the final transformation specification takes the form of an XQuery expression, such as the ones seen in FIGS. 6 and 11.

In FIG. 9A, the reference numeral 300 illustrates the general flow for deriving sub-iteration contexts using a chosen heuristic. In step 310, the module selects a heuristic to use for the transformation operation. In step 320 the module selects an ECON from the target template, and then in step 330 the selected heuristic is applied to the ECON, thereby associating the ECON with a potentially null RPE. In step 340 the module checks to see if the associated RPE is null, and if so, the module cycles back to step 320 and retrieves the next ECON from the target template. Otherwise, in step 350 the module creates a sub-iteration context that represents the association of the ECON with the RPE found in step 330. Finally, in step 360 the module determines if there are more ECONs to process, and if so, it cycles back to step 320. Otherwise, the process of deriving sub-iteration contexts for the user-specified target template is complete.

FIG. 9B designates, with reference numeral 400, a flow chart depicting the details of an exemplary method (heuristic) for completing step 330 of reference numeral 300. This described heuristic corresponds to Heuristic E of FIG. 8. In step 410 the sub-iteration module receives an ECON from the target template, and then in step 420, the module determines which of the binding variables within the target template are "direct binding children" (DBC) of the received ECON. Direct binding children of an ECON are those binding variables within the target template which satisfy either of the following two criteria: a) the binding variable itself appears a direct child of the ECON; or b) the binding variable is used as input to a function expression, where that function expression appears a direct child of the ECON. From those criteria, it follows that a particular binding variable will always be a direct binding child for exactly one ECON. In the exemplary target template of FIG. 5, the "employee" ECON has three direct binding children: $BINDEXP0, $BINDEXP1, and $BINDEXP4. The "bonus_amount" ECON has $BINDEXP2 as its only direct binding child, and similarly, the "emp_total_bonus" ECON has $BINDEXP3 as its only direct binding child. Note that the "output" ECON does not have any direct binding children; there are binding variables in the tree beneath "output", but they are children of ECONs which are in turn children of "output", and thus they are not direct binding children of "output".

In step 430, the sub-iteration module determines which of the direct binding children for the selected ECON are used as inputs to aggregate function expressions, and the module discards them from the set of direct binding children. An aggregate function expression is loosely defined as any function expression having at least one input argument that accepts a sequence of more than one value. For the exemplary target template and generic bindings of FIG. 5, there is only one binding variable that is used as input to an aggregate function expression, namely, $BINDEXP3. So that variable will be removed from the set of direct binding children for the "emp_total_bonus" ECON.

In step 440, the sub-iteration module checks to see if the remaining set of direct binding children for the selected ECON is empty, and if so, the RPE associated with the received ECON is set to "null" and processing for process 400 is complete. Otherwise, in step 450 the module calculates the covering path expression for each remaining direct binding child of the received ECON. A covering path expression (CPE) is the single RPE from step 250 that satisfies the following "longest prefix" criteria for a given direct binding child: a) if the direct binding child is used as input to a function expression, then RPE is a prefix to the direct binding child's associated binding path expression, else RPE is a strict prefix to the direct binding child's associated binding path expression; and b) there is no other RPE' in the set from step 250 which satisfies criteria "a" and which is also prefixed by RPE. A path expression PE1 is a "prefix" to another path expression PE2 if a) PE1 and PE2 equal each other, or b) PE2 starts with PE1. A path expression PE1 is a "strict prefix" to another path expression PE2 if PE1 starts with, but is not equal to, PE2. Thus the path expression "/emps_by_dept/dept" is a prefix to both "/emps_by_dept/dept" and "/emps_by_dept/dept/emp", but is only a strict prefix to "/emps_by_dept/dept/emp". When applied to the exemplary template and binding variables in FIG. 5, step 450 will return the following covering path expressions for the transformation:

| Binding Child => | Covering Path Expression |
| --- | --- |
| $BINDEXP0 => | /emps_by_dept/dept/emp |
| $BINDEXP1 => | /emps_by_dept/dept/emp |
| $BINDEXP2 => | /emps_by_dept/dept/emp/bonus |
| $BINDEXP4 => | /emps_by_dept/dept |

Notice how $BINDEXP3 is not included in the list because it was removed from the "emp_total_bonus" ECON's set of direct binding children as part of step 430.

In step 460, the sub-iteration module determines which RPE from step 250 should be associated with the set of covering path expressions calculated in step 450. The module does this by first taking the set of covering path expressions for the selected ECON and eliminating any duplicates, and then determining the single covering path expression to which every covering path expression in the set is a prefix. This single covering path expression is the RPE with which the covering path expressions for the selected ECON are associated. If there is no covering path expression that satisfies the criteria, then the associated RPE is "null." For the exemplary template and binding variables in FIG. 5, the full set of covering path expressions for the "employee" ECON contains the following two path expressions, after the removal of duplicates: {/emps_by_dept/dept, /emps_by_dept/dept/emp}. Because "/emps_by_dept/dept/emp" is by definition a prefix to itself, it is the only path expression in the set which is prefixed by every path expression in the set. Thus "/emps_by_dept/dept/emp" becomes the RPE that is associated with the set of covering path expressions for the "employee" ECON. The RPE associated with the covering path expressions for the "bonus_amount" ECON will be "/emps_by_dept/dept/emp/bonus", because that is the only covering path expression in the set for "bonus_amount". Neither the "output" ECON nor the "emp_total_bonus" ECON will have an associated RPE because neither has any direct binding children that make it to step 450.

Upon completion of step 460, the sub-iteration module has finished applying the exemplary heuristic to the received ECON, and so returns the RPE found in step 460. In the case of the exemplary target template and generic bindings of FIG. 5, the final set of sub-iteration contexts that are derived from the complete methods of FIG. 9A and FIG. 9B is shown as Heuristic E in FIG. 8.

In FIG. 10, the reference numeral 500 generally designates a flow chart depicting the details of step 270, the calculation of sub-iteration points and exact bindings from the derived and explicit sub-iteration contexts. A sub-iteration point is similar to a sub-iteration context in that it is the association of an ECON with an RPE. There are, however, two key differences between sub-iteration contexts and sub-iteration points. First, an ECON can have at most one sub-iteration context associated with it, but it can be associated with any number of sub-iteration points. Second, the RPEs for sub-iteration contexts are always absolute with respect to the source data paths, whereas the RPEs for sub-iteration points can ultimately be relative to, and therefore "nested within", each other. Further, the path expression of a sub-iteration point for one ECON can be relative to, and therefore nested within, the path expression of a sub-iteration point for another, different ECON.

The sub-iteration module uses the set of derived sub-iteration contexts from step 260, along with the RPEs from step 250 and the other inputs from steps 210 through 240, to generate a mapping from the source data instance to a target data instance. At a logical level this process can be divide into two phases: 1) walking over the user-specified template and "marking it up" by adding sub-iteration points; and 2) converting generic bindings to exact bindings, where an exact binding is one whose expression is defined with respect to a particular sub-iteration point. The resultant set of sub-iteration points and exact bindings can then be mapped directly into a final transformation specification which, when executed by the integration engine, will accomplish the desired transformation.

More specifically, sub-iteration points and exact bindings serve three purposes in the context of a data transformation. First, sub-iteration points ensure that all relevant data operations will repeat in accordance with the derived and explicit sub-iteration contexts. A "data operation" in this case can be any type of data manipulation, including, but not limited to, construction of output structures, evaluation of expressions, and grouping, filtering, and/or sorting operations. Second, sub-iteration points enforce an "ordering" on all iteration points that affect the data transformation. The ordering determines if and how different iteration points are nested within each other. Finally, exact bindings serve to define how references to source nodes should be bound, where binding of a given source node reference occurs based on where the data operation which consumes that reference appears within the potentially nested set of sub-iteration points.

In step 510, the sub-iteration module receives the set of derived sub-iteration contexts, the RPEs, the generic bindings, and the set of explicit sub-iteration contexts. In step 515, the sub-iteration module selects one of the derived sub-iteration contexts from step 260. If no derived sub-iteration context exists after step 260, then the sub-iteration module will skip to step 540. Otherwise, in step 520, the sub-iteration module retrieves the ECON and RPE from the sub-iteration context.

In step 525, the sub-iteration module determines how the RPE for the selected derived sub-iteration context relates to other repeating path expressions—and in particular, it determines how the RPE is "nested within" those other expressions. The module first creates a working set of path expressions for the ECON of the selected derived sub-iteration context. The working set is initially empty. Then the module looks to see if the ECON for the selected derived sub-iteration context has a corresponding "explicit" sub-iteration context. An explicit sub-iteration context is one that the sub-iteration module receives directly from the integration engine; the module itself does not calculate explicit sub-iteration points, it just uses them if they exist. If an explicit sub-iteration context does exist for the ECON of the selected derived sub-iteration context, then the module adds the explicit sub-iteration context's path to the working set of path expressions. It also adds to the working set all RPEs from step 250 that are prefixes to the explicit sub-iteration context's path expression. If (and only if) there is no explicit sub-iteration context for the ECON of the selected derived sub-iteration context, then the module will look at the RPE of the selected derived sub-iteration context. If that RPE is not NULL, the module will add to the working set of path expressions all RPEs from step 250 that are prefixes to the RPE of the selected derived sub-iteration context. Having thus found a working set of RPEs for the selected derived sub-iteration context, the module discards from the working set any path expression PE(i) for which there exists some other sub-iteration context such that: a) the ECON for that other sub-iteration context is an ancestor to the ECON associated with the selected derived sub-iteration context, and b) if the ECON for that other sub-iteration context has an associated explicit sub-iteration context, then the path expression of the explicit sub-iteration context equals PE(i), else the RPE for that other sub-iteration context equals PE(i).

The first sub-iteration context shown in FIG. 8 for Heuristic E is for the "output" ECON. That ECON does not have an associated explicit sub-iteration context, nor does it have an RPE associated with it. Thus the working set of RPEs for the "output" ECON is empty, which means it will not have any calculated sub-iteration points. The module will then go back to step 515 to retrieve the next derived sub-iteration context, which is the "employee" ECON. That ECON does not have an associated explicit sub-iteration context, but it does have an RPE associated with it, namely /emps_by_dept/dept/emp. The set of RPEs from step 250 is {/emps_by_dept/dept, /emps_by_dept/dept/emp, /emps_by_dept/dept/emp/bonus}. Of those paths, both /emps_by_dept/dept and /emps_by_dept/dept/emp are prefixes to the RPE of the selected derived sub-iteration context, and will be added to the working set of RPEs for the "employee" ECON.

In step 530 the sub-iteration module calculates a set of sub-iteration points for the ECON of the selected derived sub-iteration context. There will be one sub-iteration point for each path expression that is in the working set of path expressions from step 525. Further, all calculated sub-iteration points for ECON will be created such that they reflect proper "nesting" with respect to each other, where nesting is derived based on if and how the path expressions from step 525 prefix each other. Thus after step 530, the "employee" ECON from the exemplary target template will be associated with two calculated sub-iteration points, where the second one is nested within the first: {$d: "/emps_by_dept/dept", and $e: "$d/emp"}.

In step 535, the sub-iteration module checks to see if there are other derived sub-iteration contexts for which sub-iteration points have not yet been calculated, and if so, steps 515 through 530 are repeated for each remaining unprocessed derived sub-iteration context. In the case of the exemplary sub-iteration contexts for Heuristic E in FIG. 8, the sub-iteration module repeats steps 515 through 530 to determine that the "bonus_amount" ECON will have a single calculated sub-iteration point, namely {$b: "/emps_by_dept/dept/emp/bonus"}. As for the fourth sub-iteration context, whose ECON is "emp_total_bonus", there is no explicit sub-iteration context for that ECON, nor is there an associated RPE. Thus it will not have any calculated sub-iteration points. An ECON for which there are no calculated sub-iteration points will iterate based on the sub-iteration points of its ancestor ECONs (if any).

At this point all derived sub-iteration contexts have been processed, and in step 540 the sub-iteration module determines if there are any explicit sub-iteration contexts that are unprocessed, meaning that the ECONs with which they are associated have not gone through the phase of calculating sub-iteration points. If unprocessed explicit sub-iteration contexts exist, the module will perform steps 520 through 530 for each one. Because there are no explicit sub-iteration contexts for the running example, the module will move on to step 545 and order the entire set of calculated sub-iteration points, where "ordering" entails updating the sub-iteration point paths so that they reflect proper "nesting" with respect to each other. This is different from the ordering of step 530 because at this point, sub-iteration points can be nested within other sub-iteration points from different ECONs, whereas the nesting in step 530 was within the context of a specific ECON. Upon completion of step 545, the exemplary sub-iteration contexts for Heuristic E from FIG. 8 will yield the following complete set of calculated sub-iteration points: {$d: "/emps_by_dept/dept", $e: "$d/emp", "$b: $e/bonus"}. The generation of such sub-iteration points, and their association with the ECONs for which they were generated, can be illustrated using XQuery notation as follows:

```
<output>
    for $d in /emps by dept/dept
        for $e in $d/emp
            return
                <employee>
                    {concat($BINDEXP0," ",$BINDEXP1) }
                    {
                        for $b in $e/bonus
                        {
                            return
                                <bonus_amount>
                                    {$BINDEXP2}
                                </bonus_amount>
                        }
                    }
                    <emp_total_bonus>
                        {sum($BINDEXP3)}
                    <emp_total_bonus>
                    {$BINDEXP4 }
                </employee>
</output>
```

A given ECON is associated with all sub-iteration points (i.e. FOR loops) that enclose it.

In step 550, the sub-iteration module converts the generic bindings that it received as input into exact bindings. More specifically, the module examines each binding expression in the received set of generic bindings, and for each one, it does two things. First, it finds a sub-iteration point for the binding which satisfies the following "longest prefix" criteria: a) the sub-iteration point is associated with an ECON which equals, or is an ancestor to, the ECON that is parent to the binding expression; b) if the binding expression serves as input to an aggregate function expression, then the path for the sub-iteration point is a strict prefix to the binding expression, else the path for the sub-iteration point is a prefix to the binding expression; and c) the path for the sub-iteration point equals or is prefixed by the paths of all other sub-iteration points that satisfy criteria "a" and "b" (if any). Second, if the module finds a sub-iteration point that satisfies the "longest prefix" criteria, it updates the binding expression so that it is relative to that sub-iteration point. The updated binding expression is now an exact binding. The complete set of exact bindings that would be created based on the aforementioned sub-iteration points and the generic bindings of FIG. 5 would be:

```
$BINDEXP0: $e/first
$BINDEXP1: $e/last
$BINDEXP2: $b/text( )
$BINDEXP3: $e/bonus/text( )
$BINDEXP4: $d/dep_total_bonus
```

In step 555, the sub-iteration module determines if there are any sub-iteration points from step 545 that are not referenced by at least one other sub-iteration point, and that also are not referenced by any of the exact bindings. Any such sub-iteration points are discarded. For the running example, all of the sub-iteration points are referenced, so the module will preserve them all. In step 560, the preserved sub-iteration points and exact bindings are returned, and the module has then completed the step of calculating sub-iteration points and exact bindings.

The methods disclosed herein, in combination with the explicit sub-iteration contexts mentioned above, can be used to effectively override derived sub-iteration contexts if and when a given heuristic does not return the desired set of derived sub-iteration contexts. The data mashup "unnest" or "extract" operator provides a simple example. Such an operator extracts or "pulls up" nested repeating structures from the source instance data so that, in the target instance, that structure repeats at the top-most level, effectively creating multiple target instances with the same structure. The unnested result can then be fed into other, subsequent data mashup operators to increase the semantic quality of those operations when repeating elements are involved. For example, assume the source data is as follows:

```
<emps_by_dept>
    <dept id="1">
        <dep_total_bonus>20000</total_bonus>
        <emp>
            <last>Montoya</last>
            <first>Inigo</first>
            <workloc>Chicago</workloc>
            <bonus when="Q1">8000</bonus>
            <bonus when="Q2">3000</bonus>
        </emp>
```

```
        <emp>
            <last>Tortoya</last>
            <first>Tortuga</first>
            <workloc>Atlanta</workloc>
            <bonus when="Q3">1500</bonus>
        </emp>
    </dept>
    <dept id="2">
        <dep_total_bonus>30000</total_bonus>
        <emp>
            <last>Montuya</last>
            <first>Tortigo</first>
            <workloc>Chicago</workloc>
            <bonus when="Q1">2000</bonus>
            <bonus when="Q4">1000</bonus>
        </emp>
    </dept>
<emps_by_dept>
```

Now assume that the user wishes to perform a grouping operation on the above instance data, where the output includes a single group for every combination of bonus quarter and work location. Within each group, the user wishes to include data about all employees who fall into that group. Assuming that the user specifies to group on: /emps_by_dept/dept/emp/workloc/text( ) and /emps_by_dept/dept/emp/bonus/@when, then, because there is only a single instance of the source data, there would only be a single grouping key which applies to the entire instance of source data, namely: {"Chicago Atlanta Chicago", "Q1 Q2 Q3 Q1 Q4"}, and the result will be a single group which looks something like:

```
<group>
    <workloc>Chicago Atlanta Chicago</workloc>
    <bonus_quarter>Q1 Q2 Q3 Q1 Q4</bonus_quarter>
    <emp>
        <last>Montuya</last>
        <first>Inigo</first>
        <workloc>Chicago</workloc>
        <bonus when="Q1">8000</bonus>
        <bonus when="Q2">3000</bonus>
    </emp>
    <emp>
        <last>Tortoya</last>
        <first>Tortuga</first>
        <workloc>Atlanta</workloc>
        <bonus when="Q3">1500</bonus>
    </emp>
    <emp>
        <last>Montuya</last>
        <first>Tortigo</first>
        <workloc>Chicago</workloc>
        <bonus when="Q1">2000</bonus>
        <bonus when="Q4">1000</bonus>
    </emp>
</group>
```

So in effect the group was simply a data transformation; it didn't actually do any real grouping. If, however, explicit sub-iteration contexts are used in conjunction with derived sub-iteration contexts to achieve an "extract" operation, the grouping operation then becomes more functional. More specifically, the relevant pieces of data can be extracted from the source instance data, thereby creating a new set of data instances with similar structure. The end user can perform said extraction by creating an Extract operator that specifies the relevant source data nodes and indicates, e.g., that one target instance should be created for each bonus. The data mashup data integration system will then use the Extract operator in invoking the sub-iteration module with the following inputs:

Source data instance: As shown above.
Target template:

```
<input_entry>
    {$BINDEXP0}
    <bonus_quarter>
        {trim($BINDEXP1)}
    </bonus_quarter>
    {$BINDEXP2}
<input_entry>
```

Generic bindings:

```
$BINDEXP0 = /emps_by_dept/dept/emp/workloc
$BINDEXP1 = /emps_by_dept/dept/emp/bonus/@when
$BINDEXP2 = /emps_by_dept/dept/emp
```

Explicit sub-iteration points:

```
/input_entry => /emps_by_dept/dept/emp/bonus
```

From there the sub-iteration module will start by detecting all RPEs for the operation (step 250), and will find {/emps_by_dept/dept, /emps_by_dept/dept/emp, /emps_by_dept/dept/emp/bonus}. It will then select and apply an heuristic for deriving sub-iteration contexts. For this example Heuristic E is used, and produces the following set of derived sub-iteration contexts:

| "input_entry" ECON => | /emps_by_dept/dept/emp |
|---|---|
| "bonus_amount" ECON => | /emps_by_dept/dept/emp/bonus |

Having thus derived sub-iteration contexts, the module will attempt to calculate sub-iteration points for the transformation, per steps 515 thru 530. It will start with the "input_entry" ECON, and will find that there is an explicit sub-iteration context associated with that entry. The path expression of the explicit sub-iteration context is /emps_by_dept/dept/emp/bonus, so that path, along with all RPEs that are prefixes to it, will be added to the working set of path expressions for "input_entry". Thus the working set will have all of {/emps_by_dept/dept, /emps_by_dept/dept/emp, /emps_by_dept/dept/emp/bonus}. Then in step 530 the module calculates three sub-iteration points, all of which will be associated with "input_entry": {$d: /emps_by_dept/dept, $e: $e/emp, $b: $e/bonus}. In step 535 the module will cycle back to 315 and retrieve the next ECON, "bonus_amount", and find that all of that path expressions in its working set have already been declared by "input_entry". Thus the module will not add any new sub-iteration points for the "bonus_amount" ECON. Because there are no more ECONs in the template, the module will proceed to step 540. It will find that all explicit sub-iteration contexts have already been processed, so it will proceed to step 545. Because all sub-iteration points came from the same ECON and thus were already ordered after step 530, step 545 preserves the order of sub-iteration points.

Note that due to the explicit sub-iteration context, which takes precedence over the derived sub-iteration context for "input_entry", the calculated set of sub-iteration points associates "$b" with the "input_entry" ECON instead of with the "bonus_amount" ECON. That means iteration for the "input_entry" will be over the bonus source nodes, instead of over the emp source nodes. Thus the explicit sub-iteration context effectively allowed the data mashup data integration system to override the sub-iteration context that was derived by the chosen heuristic. As a result, the transformation operation will create one "input_entry" output node for each bonus, which is what the example requires, instead of creating one for each emp.

The sub-iteration module will then convert the generic bindings into exact bindings in step 350:

```
$BINDEXP0 = $e/workloc
$BINDEXP1 = $b/@when
$BINDEXP2 = $e
```

Finally, the sub-iteration module use the calculated sub-iteration points and exact bindings to create the following transformation specification for the "extract" operation:

```
for $d in /emps_by_dept/dept
    for $e in $d/emp
        let $e_wloc := $e/workloc
        for $b in $e/bonus
            let $b_when := $b/@when
            return
                <input_entry>
                    { $e_wloc }
                    <bonus_quarter>{ trim($b_when)
                    }</bonus_quarter>
                    { $e }
                </input_entry>
```

When the above transformation specification is applied to the source instance data shown above, the target feed ends up looking like the following:

```
<input_entry>
    <workloc>Chicago</workloc>
    <bonus_quarter>Q1</bonus_quarter>
    <emp>
        <last>Montoya</last>
        <first>Inigo</first>
        <workloc>Chicago</workloc>
        <bonus when="Q1">8000</bonus>
        <bonus when="Q2">3000</bonus>
    </emp>
</input_entry>
<input_entry>
    <workloc>Chicago</workloc>
    <bonus_quarter>Q2</bonus_quarter>
    <emp>
        <last>Montoya</last>
        <first>Inigo</first>
        <workloc>Chicago</workloc>
        <bonus when="Q1">8000</bonus>
        <bonus when="Q2">3000</bonus>
    </emp>
</input_entry>
<input_entry>
    <workloc>Atlanta</workloc>
    <bonus_quarter>Q3</bonus_quarter>
    <emp>
        <last>Tortoya</last>
        <first>Tortuga</first>
        <workloc>Atlanta</workloc>
        <bonus when="Q3">1500</bonus>
    </emp>
</input_entry>
<input_entry>
    <workloc>Chicago</workloc>
    <bonus_quarter>Q1</bonus_quarter>
    <emp>
        <last>Montuya</last>
        <first>Tortigo</first>
        <workloc>Chicago</workloc>
        <bonus when="Q1">2000</bonus>
        <bonus when="Q4">1000</bonus>
    </emp>
</input_entry>
<input_entry>
    <workloc>Chicago</workloc>
    <bonus_quarter>Q4</bonus_quarter>
    <emp>
        <last>Montuya</last>
        <first>Tortigo</first>
        <workloc>Chicago</workloc>
        <bonus when="Q1">2000</bonus>
        <bonus when="Q4">1000</bonus>
    </emp>
</input_entry>
```

Now there are five (5) different instances of data, all containing the relevant associated data from the original input. With the data extracted in this manner, the user can perform the desired grouping operator across all of the new instances, specifying that the groups should be created from: /input_entry/workloc/text( ) and /input_entry/bonus_quarter/text( ). That will lead to four (4) distinct grouping keys, namely:

```
{ "Chicago",  "Q1" }
{ "Chicago",  "Q2" }
{ "Atlanta",  "Q3" }
{ "Chicago",  "Q4" }
``` which in turn gives four different groups as the result:

```
<group>
    <workloc>Chicago</workloc>
    <bonus_quarter>Q1</bonus_quarter>
    <emp>
        <last>Montoya</last>
        <first>Inigo</first>
        <workloc>Chicago</workloc>
        <bonus when="Q1">8000</bonus>
        <bonus when="Q2">3000</bonus>
    </emp>
    <emp>
        <last>Montoya</last>
        <first>Tortigo</first>
        <workloc>Chicago</workloc>
        <bonus when="Q1">2000</bonus>
        <bonus when="Q4">1000</bonus>
    </emp>
</group>
<group>
    <workloc>Chicago</workloc>
    <bonus_quarter>Q2</bonus_quarter>
    <emp>
        <last>Montoya</last>
        <first>Inigo</first>
        <workloc>Chicago</workloc>
        <bonus when="Q1">8000</bonus>
        <bonus when="Q2">3000</bonus>
    </emp>
```

-continued

```
        </group>
        <group>
            <workloc>Atlanta</workloc>
            <bonus_quarter>Q3</bonus_quarter>
            <emp>
                <last>Tortoya</last>
                <first>Tortuga</first>
                <workloc>Atlanta</workloc>
                <bonus when="Q3">1500</bonus>
            </emp>
        </group>
        <group>
            <workloc>Chicago</workloc>
            <bonus_quarter>Q4</bonus_quarter>
            <emp>
                <last>Montuya</last>
                <first>Tortigo</first>
                <workloc>Chicago</workloc>
                <bonus when="Q1">2000</bonus>
                <bonus when="Q4">1000</bonus>
            </emp>
        </group>
```

Thus the exposure of an extraction operator, which uses explicit sub-iteration contexts to override the otherwise heuristic directives of the data integration system, can be useful as a helper operator to a user who is trying to do things like grouping and filtering when repeating elements are involved. In another embodiment, the currently explicit Extract operator can be embedded directly into the other operators so that the user does not have to explicitly specify such functionality. Then, derivation of sub-iteration contexts, and calculation of sub-iteration points and exact bindings, would be an automatic part of such operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention may be distributed in any manner among the sub-iteration module, transformation operation in a data integration system, database server, and client systems.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for deriving and applying sub-iteration contexts in a transformation operation in a data integration system, comprising:
   receiving a source data instance comprising a plurality of source nodes with associated source node values, and a plurality of source data paths connecting the source nodes;
   detecting one or more repeating path expressions in the source data instance, wherein a repeating path expression is a source data path that connects two or more source nodes that are siblings to each other;
   receiving a target template comprising a plurality of explicitly created output nodes (ECONs), wherein the target template specifies a structure of a target data instance;
   deriving one or more sub-iteration contexts for each ECON in the received target template, wherein each sub-iteration context comprises an association between the ECON and one of the detected repeating path expressions, and wherein each sub-iteration context directs how the ECON will repeat in the target data instance;
   calculating a set of one or more sub-iteration points and a set of exact bindings from the derived sub-iteration contexts;
   generating a transformation specification from the set of sub-iteration points and exact bindings; and
   applying said transformation specification to the source instance data to generate the target data instance.

2. The method according to claim 1, wherein at least one of the steps is implemented on a computer system.

3. The method according to claim 1, wherein the data integration system is a data mashup system.

4. The method according to claim 1, further comprising receiving a set of explicit sub-iteration contexts;
   wherein said calculation step comprises calculating a set of one or more sub-iteration points and the set of exact bindings from the derived sub-iteration contexts and the set of explicit sub-iteration contexts.

5. The method according to claim 1, wherein said step of deriving one or more sub-iteration contexts comprises, for each ECON:
   selecting one of the one or more ECONs;
   applying a pre-determined heuristic to the target template and the detected repeating path expressions in order to determine which one of the detected repeating path expressions is associated with the selected ECON.

6. The method according to claim 5, further comprising receiving a set of explicit sub-iteration contexts;
   wherein said application step comprises applying the pre-determined heuristic to the target template, the detected repeating path expressions, and the set of explicit sub-iteration contexts in order to determine which one of the one or more repeating path expressions is associated with the selected ECON.

7. The method according to claim 5, wherein said step of deriving one or more sub-iteration contexts further comprises:
   wherein, if the repeating path expression for the selected ECON is null, then the selected ECON is assigned a sub-iteration context that has been derived for an ancestor node of the selected ECON, wherein if the selected ECON has no ancestor node or there is no ancestor node with a non-null repeating path expression, then the selected ECON will not repeat in the target data instance.

8. The method according to claim 1, wherein said step of calculating a set of one or more sub-iteration points and a set of exact bindings comprises:
   receiving a set of generic binding expressions;
   calculating the set of one or more sub-iteration points by, for each sub-iteration context:
      selecting one of the sub-iteration contexts;
      determining a subset of the repeating path expressions by selecting each repeating path expression that is a prefix to the repeating path expression for the selected sub-iteration context;
      creating one sub-iteration point for each repeating path expression in the determined subset,
   ordering the set of calculated sub-iteration points to reflect the nesting structure of the ECONs that are associated with them;
   changing the set of generic binding expressions into the set of exact bindings, which are relative to said calculated sub-iteration points; and
   removing any unused sub-iteration points from the set of calculated sub-iteration points, wherein an unused sub-iteration point is a sub-iteration point that is neither referenced by another calculated sub-iteration point nor referenced by any exact binding in the set of exact bindings.

9. A computer program product comprising a computer useable medium having a computer readable program, wherein the computer readable program when executed on a computer causes the computer to:
   receive a source data instance comprising a plurality of source nodes with associated source node values, and a plurality of source data paths connecting the source nodes;
   in response to receiving the source instance data, detecting one or more repeating path expressions in the source data instance, wherein a repeating path expression is a source data path that connects two or more source nodes that are siblings to each other;
   receive a user-specified target template comprising a plurality of explicitly created output nodes (ECONs), wherein the target template specifies a structure of a target data instance;
   in response to receiving the source instance data and the user-specified target template, derive one or more sub-iteration contexts for each ECON in the user-specified target template, wherein each sub-iteration context comprises an association between the ECON and one of the detected repeating path expressions, and wherein each sub-iteration context directs how the ECON will repeat in the target data instance;
   calculate a set of one or more sub-iteration points and a set of exact bindings from the derived sub-iteration contexts;
   generate a transformation specification from the set of sub-iteration points and exact bindings; and
   apply said transformation specification to the source instance data to generate the target data instance.

10. The computer program product of claim 9, wherein the computer program product is stored on a computer useable optical storage medium.

11. The computer program product of claim 9, wherein the computer program product is stored on a hard disk.

12. The computer program product of claim 9, wherein the calculation of the set of one or more sub-iteration points comprises the computer readable program when executed on a computer causing the computer to:
   receive a set of explicit sub-iteration contexts; and
   calculate the set of one or more sub-iteration points and the set of exact bindings from the derived sub-iteration contexts and the set of explicit sub-iteration contexts.

13. The computer program product of claim 9, wherein the derivation of one or more sub-iteration contexts comprises, for each ECON, the computer readable program when executed on a computer causing the computer to:
   select one of the one or more ECONs;
   apply a pre-determined heuristic to the target template and the detected repeating path expressions in order to determine which one of the detected repeating path expressions is associated with the selected ECON.

14. The computer program product of claim 13, wherein the application of the pre-determined heuristic comprises the computer readable program when executed on a computer causing the computer to:
   receive a set of explicit sub-iteration contexts; and
   apply the pre-determined heuristic to the target template, the detected repeating path expressions, and the set of explicit sub-iteration contexts in order to determine which one of the one or more repeating path expressions is associated with the selected ECON.

15. The computer program product of claim 13, wherein the derivation of said one or more sub-iteration contexts comprises, for each ECON, the computer readable program when executed on a computer causing the computer to:
   assign to the selected ECON, if the repeating path expression for the selected ECON is null, a sub-iteration context that has been derived for an ancestor node of the selected ECON, wherein if the selected ECON has no ancestor node or there is no ancestor node with a non-null repeating path expression, then the selected ECON will not repeat in the target data instance.

16. The computer program product of claim 9, wherein the calculation of the set of one or more sub-iteration points and the set of exact bindings comprises, the computer readable program when executed on a computer causing the computer to:
   receive a set of generic binding expressions;
   calculate the set of one or more sub-iteration points by, for each sub-iteration context:
      select one of the sub-iteration contexts;
      determine a subset of the repeating path expressions by selecting each repeating path expression that is a prefix to the repeating path expression for the selected sub-iteration context;

create one sub-iteration point for each repeating path expression in the determined subset, order the set of calculated sub-iteration points to reflect the nesting structure of the ECONs that are associated with them;

change the set of generic binding expressions into the set of exact bindings, which are relative to said calculated sub-iteration points; and remove any unused sub-iteration points from the set of calculated sub-iteration points, wherein an unused sub-iteration point is a sub-iteration point that is neither referenced by another calculated sub-iteration point nor referenced by any exact binding in the set of exact bindings.

17. A system for deriving and applying sub-iteration contexts in a transformation operation in a data integration system, comprising:

a memory having a source data instance stored therein, wherein the source data instance comprises a plurality of source nodes with associated source node values, and a plurality of source data paths connecting the source nodes; and a processor configured with logic to:

receive a source data instance comprising a plurality of source nodes with associated source node values, and a plurality of source data paths connecting the source nodes;

in response to receiving the source instance data, detecting one or more repeating path expressions in the source data instance, wherein a repeating path expression is a source data path that connects two or more source nodes that are siblings to each other;

receive a user-specified target template comprising a plurality of explicitly created output nodes (ECONs), wherein the target template specifies a structure of a target data instance;

in response to receiving the source instance data and the user-specified target template, derive one or more sub-iteration contexts for each ECON in the user-specified target template, wherein each sub-iteration context comprises an association between the ECON and one of the detected repeating path expressions, and wherein each sub-iteration context directs how the ECON will repeat in the target data instance;

calculate a set of one or more sub-iteration points and a set of exact bindings from the derived sub-iteration contexts;

generate a transformation specification from the set of sub-iteration points and exact bindings; and apply said transformation specification to the source instance data to generate the target data instance.

18. The system of claim 17, wherein the transformation operation in a data integration system is a data mashup system.

19. The system of claim 17, wherein the derivation of said one or more sub-iteration contexts comprises, for each explicitly created output node (ECON), the processor being further configured with the logic to:

select one of said one or more explicitly created output nodes (ECONs);

determine which of the reference input nodes and copied input nodes are direct children of the selected explicitly created output node (ECON);

determine, for each direct child node, an input data path for the direct child node;

determine a set of covering path expressions, by determining, for each input data path a corresponding covering path expression, wherein each corresponding covering path expression is the longest repeating path expression that is a prefix to the input data path if the input data path came from a reference input node, or a strict prefix to the input data path if the input data path came from a copied input node, wherein a strict prefix cannot equal the input data path; and determine the sub-iteration repeating path from the set of covering path expressions, wherein the sub-iteration repeating path is the single covering path expression in the set to which every covering path expression in the set is a prefix.

20. The system of claim 17, wherein the calculation of the set of one or more sub-iteration points comprises the processor being further configured with the logic to:

receive a set of explicit sub-iteration contexts; and calculate the set of one or more sub-iteration points and the set of exact bindings from the derived sub-iteration contexts and the set of explicit sub-iteration contexts.

21. The system of claim 17, wherein the derivation of one or more sub-iteration contexts comprises, for each ECON, the processor being further configured with the logic to:

select one of the one or more ECONs;

apply a pre-determined heuristic to the target template and the detected repeating path expressions in order to determine which one of the detected repeating path expressions is associated with the selected ECON.

22. The system of claim 21, wherein the application of the pre-determined heuristic comprises the processor being further configured with the logic to:

receive a set of explicit sub-iteration contexts; and apply the pre-determined heuristic to the target template, the detected repeating path expressions, and the set of explicit sub-iteration contexts in order to determine which one of the one or more repeating path expressions is associated with the selected ECON.

23. The system of claim 21, wherein the derivation of said one or more sub-iteration contexts comprises, for each ECON, the processor being further configured with the logic to:

assign to the selected ECON, if the repeating path expression for the selected ECON is null, a sub-iteration context that has been derived for an ancestor node of the selected ECON, wherein if the selected ECON has no ancestor node or there is no ancestor node with a non-null repeating path expression, then the selected ECON will not repeat in the target data instance.

24. The system of claim 17, wherein the calculation of the set of one or more sub-iteration points and the set of exact bindings comprises, the processor being further configured with the logic to:

receive a set of generic binding expressions;

calculate the set of one or more sub-iteration points by, for each sub-iteration context:

select one of the sub-iteration contexts;

determine a subset of the repeating path expressions by selecting each repeating path expression that is a prefix to the repeating path expression for the selected sub-iteration context;

create one sub-iteration point for each repeating path expression in the determined subset,
order the set of calculated sub-iteration points to reflect the nesting structure of the ECONs that are associated with them;
change the set of generic binding expressions into the set of exact bindings, which are relative to said calculated sub-iteration points; and
remove any unused sub-iteration points from the set of calculated sub-iteration points, wherein an unused sub-iteration point is a sub-iteration point that is neither referenced by another calculated sub-iteration point nor referenced by any exact binding in the set of exact bindings.

* * * * *